United States Patent [19]

D'Agaro

[11] Patent Number: 4,674,294
[45] Date of Patent: Jun. 23, 1987

[54] THREE-IN-ONE MOTOR VEHICLE AIR CONDITIONING SYSTEM

[76] Inventor: Raymond D'Agaro, 2831 NE. 59th Ct., Fort Lauderdale, Fla. 33308

[21] Appl. No.: 806,556

[22] Filed: Dec. 9, 1985

[51] Int. Cl.$^4$ ............................................. B60H 1/32
[52] U.S. Cl. ...................................... 62/243; 62/263; 62/323.3
[58] Field of Search ................ 62/263, DIG. 16, 243, 62/244, 323.3; 165/43

[56] References Cited

U.S. PATENT DOCUMENTS

| | | | |
|---|---|---|---|
| 2,743,589 | 5/1956 | Kuempel | 62/243 |
| 3,283,525 | 11/1966 | Fricke et al. | 62/323.3 X |
| 3,449,924 | 6/1969 | Sudmeier | 62/227 |
| 3,805,540 | 4/1974 | Schwartzman | 62/238 |
| 3,823,568 | 7/1974 | Bijasiewicz et al. | 62/7 |
| 3,850,006 | 11/1974 | Redfern et al. | 62/216 |
| 3,906,740 | 9/1975 | Thomas | 62/239 |
| 3,976,458 | 8/1976 | Krug | 62/243 X |
| 4,098,093 | 7/1978 | Czyl | 62/243 |
| 4,432,213 | 2/1984 | Katshira et al. | 62/239 |
| 4,473,109 | 9/1984 | Kojima et al. | 165/12 |
| 4,540,040 | 9/1985 | Fukumoto et al. | 62/243 X |

Primary Examiner—William E. Wayner
Attorney, Agent, or Firm—Oltman and Flynn

[57] ABSTRACT

This compact motor vehicle passenger compartment air conditioning system fits on the vehicle floor inside the motor vehicle. This mounting design avoids outside air conditioner mounting problems for vans and campers. The three-in-one motor vehicle air conditioning system achieves its space saving characteristics primarily by the use of a single coil having three separate compartments. One compartment cools by means of tapping into the vehicle's engine air conditioner. A second compartment heats by means of tapping into the vehicle's engine coolant system. A third compartment cools by means of an integral A.C. powered compressor. A primary circulation fan is powered either by D.C. or A.C. sources. A secondary exhaust fan is powered by an A.C. source. Outside air does not mix with passenger compartment air in any modes. Five modes of operation are possible with an optional onboard A.C. generator. The modes are on-the-road heating, off-the road heating, on-the-road air conditioning without using any A.C. generator, off-the road air conditioning, and on-the-road air conditioning with the use of an onboard A.C. generator.

10 Claims, 7 Drawing Figures

THREE-IN-ONE MOTOR VEHICLE AIR CONDITIONING SYSTEM

FIELD OF THE INVENTION

The present invention relates to auxiliary motor vehicle air conditioning systems. Special utility is seen in applications for motor homes and vans having a 115 Volt A.C. power hook-up.

BACKGROUND OF THE INVENTION

Larger motor vehicles, especially motor homes and vans, require auxiliary cooling and heating systems for passenger compartment air in addition to conventional engine mounted air conditioning and heating systems. The most commonly used systems today are mounted either on the roof or in the rear window of the motor vehicle. These systems can be unsightly and/or add to the vehicle height and reduce access to inside parking garages. U.S. Pat. No. 3,906,740 to Thomas discloses an under the vehicle mounted air conditioning system. This invention packages the system out of sight under the vehicle and avoids the disadvantages of externally mounted systems. The Thomas invention is strictly a 115 volt A.C. system requiring either off-the-road power or an on-the-road A.C. generator.

Applicant is not aware of any motor vehicle air conditioning system which may be mounted inside the vehicle that can alternately be powered by on-the-road engine air conditioner refrigerant or engine coolant, or an optional on board A.C. generator as well as off-the-road A.C. power.

SUMMARY OF THE INVENTION

It is, therefore, the primary object of the present invention to provide a neatly packaged single container unit that is mounted inside the motor vehicle that contains an air conditioning system which can cool or heat the passenger compartment air either on or off the road without requiring an A.C. generator.

Another object of the present invention is to design a compact space saving three-in-one coil which functions to provide on-the-road cooling by means of tapping into the engine air conditioning refrigerant and on-the-road heating by tapping into the engine water coolant system and on or off-the-road cooling by means of an A.C. powered compressor.

Another object of the present invention is to provide maximum on-the-road cooling with motor vehicles equipped with an A.C. generator by means of simultaneous use of two of the three sections of the three-in-one coil, the engine air conditioner refrigerant section and the A.C. powered evaporator section.

Another object of the present invention is to provide a primary circulation fan motor that is alternatively driven by either the 12 volt vehicle electrical system or by A.C. power rectified by means of a rectifier.

Another object of the present invention is to provide a two source heating system by means of an on-the-road tap into the engine coolant system and/or by means of an A.C. powered heating coil.

Another object of the present invention is to provide a dual fan air flow system by means of a secondary A.C. powered fan and a primary A.C. or D.C. powered fan.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figure 1:
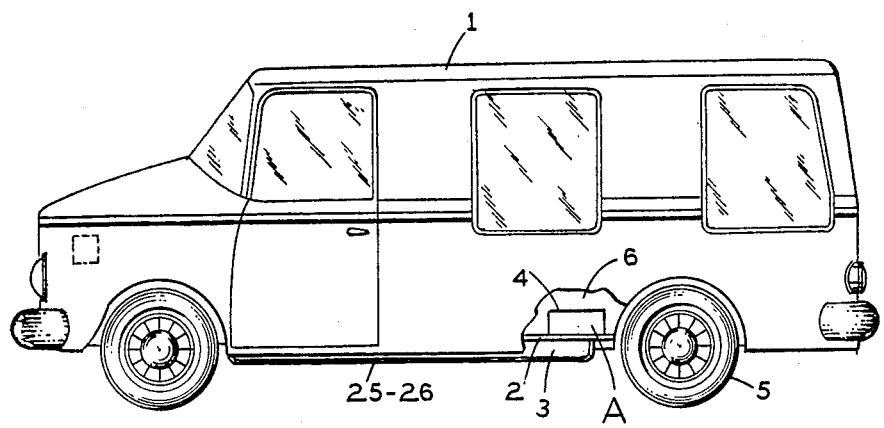
FIG. 1 is a left side elevational view of a van equipped with the present invention.

Referring first to FIG. 1, a van 1 is shown having a lower frame 3 and an inside floor 2. The three-in-one motor vehicle air conditioning system 4 is mounted in the inside passenger space 6 on the floor 2. The system 4 is mounted in front of rear wheel 5, but could be mounted wherever it is convenient inside the motor vehicle. Side A is shown for reference purposes throughout the figures.

Figure 2:
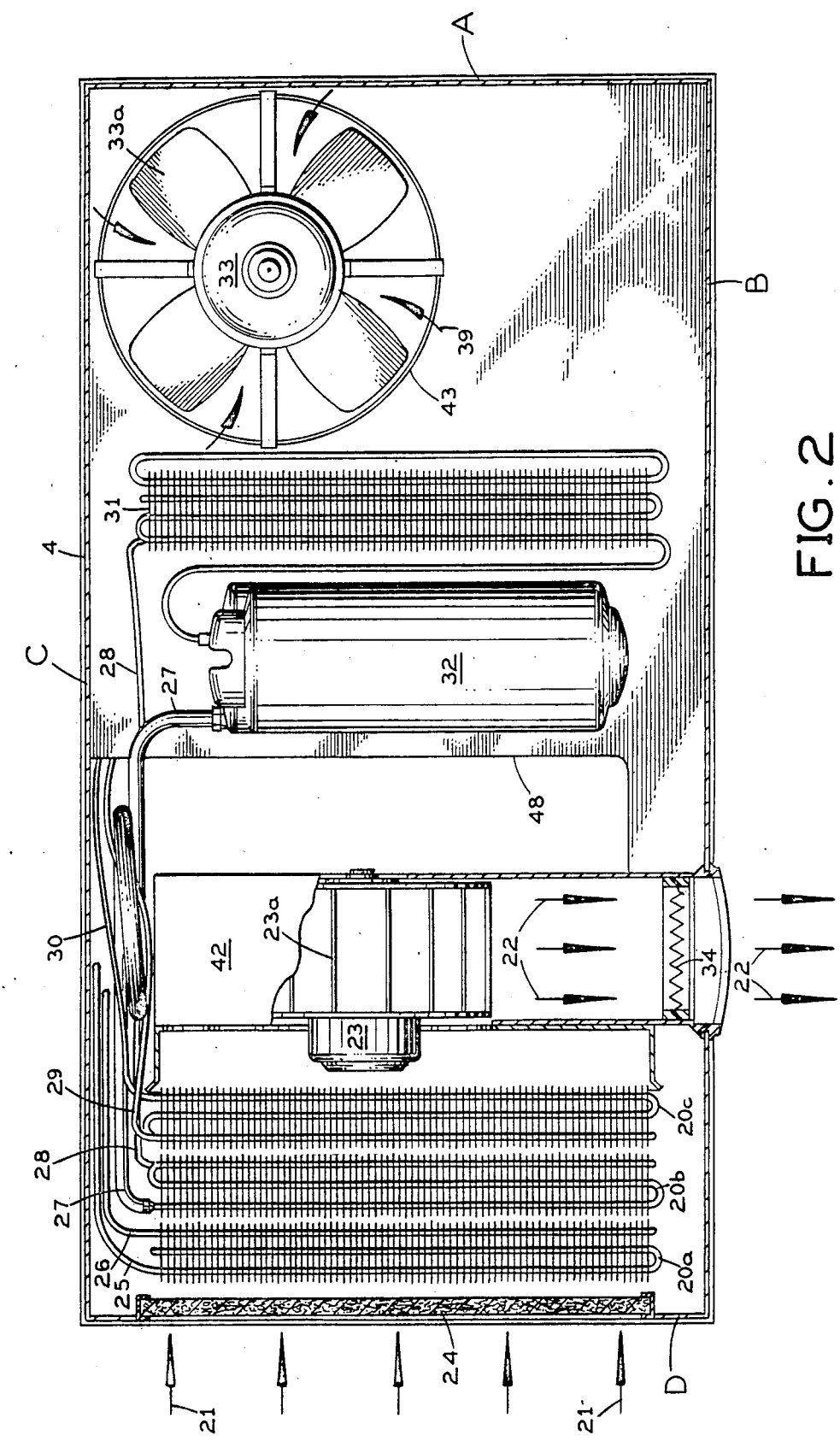
FIG. 2 is a sectional top plan view showing the component parts of the present invention.

FIG. 2 shows system 4 with the same side A facing the left side of the vehicle as in FIG. 1, side B facing forward, side C facing rearward and side D facing to the right side of the vehicle. Five modes of operation are possible with system 4. They are:

Mode 1—On the road heating—The twelve volt D.C. fan motor 23 is powered by the vehicle battery (not shown). Fan 23a draws passenger compartment 6 air 21 through air filter 24 past the three-in-one coil 20 and past the engine coolant heated coil 20a. Coil 20a is tapped directly into the engine coolant hoses (not shown) by means of tubes 25 and 26 (see FIG. 3). The heated air 22 is then blown back into the passenger compartmesnt 6.

Figure 7:
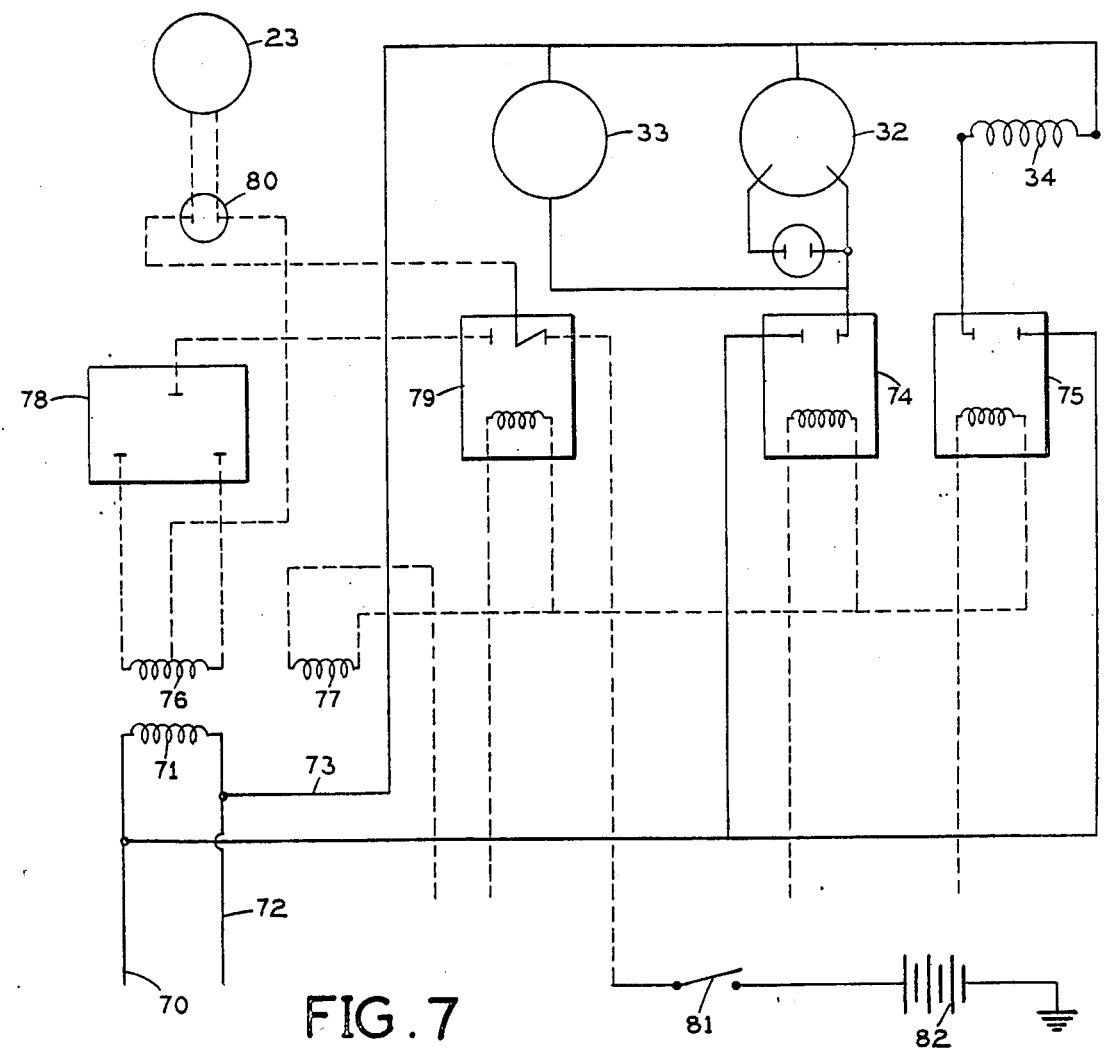
FIG. 7 is a schematic diagram of the electrical circuit controlling the A.C./D.C. primary fan motor.

Mode 2—Off the road heating—The twelve volt D.C. fan motor 23 can alternatively be powered by a 115 volt A.C. source (see FIG. 7). This 115 volt A.C. source is usually an off-the-road electrical outlet but could also be an onboard A.C. generator (not shown). The fan 23a conducts the air in the identical manner as in Mode 1. The heating element in this mode is electrical heating coil 34 which is powered by 115 volts A.C.

Mode 3—On the road air conditioning without using any A.C. generator—The three-in-one coil 20 has three separate coils, 20a, 20b and 20c. Coil 20c is connected by means of tubes 29 and 30 to the motor vehicle's air conditiong refrigerant line (not shown). Passenger compartment air 21 is drawn past the cooled coil 20c and pushed back into the passenger compartment by fan 23a. Motor 23 is powered by the motor vehicle battery (see FIG. 7).

Mode 4—Off the road air conditioning—In this case both the hermetic compressor 32 and fan motors 33 are powered by 115 volts A.C. (se FIG. 7). The hermetic compressor 32 receives chilled refrigerant by means of tube 27 from evaporator coil 20b. Fan 23a draws passenger compartment air 21 past the chilled coil 20b and forces it back out into the passenger compartment. The refrigerant now warmed returns to the compressor and on to the condenser coil 31 by means of tube 27 for air cooling and condensing of the refrigerant by means of fan 33a which draws in cooling air from the outside atmosphere. The fan 33a could be a blower.

Mode 5—On the road cooling with the use of an on-board A.C. generator—This mode simply allows modes 4 and 5 to operate simultaneously.

An alternative embodiment for all modes utilizes an A.C. only powered primary fan 23a with a D.C. to A.C. inverter for on-the-road use without an on board A.C. generator.

Figure 3:
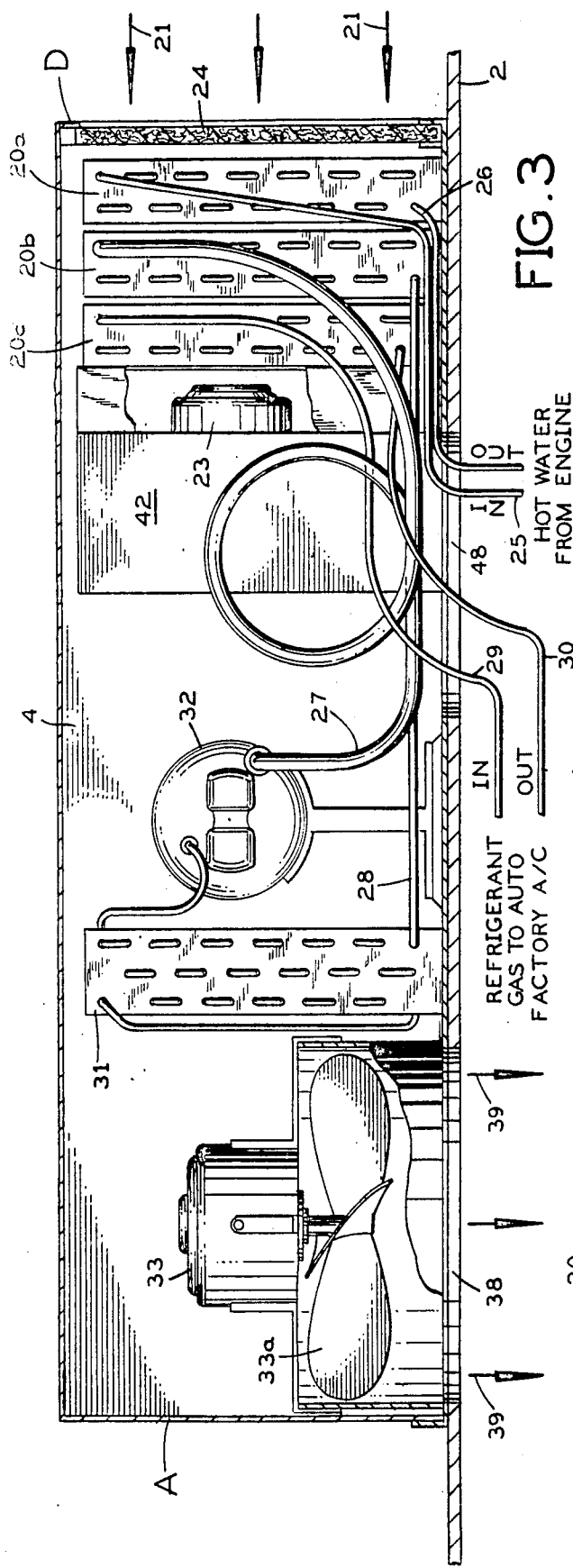
FIG. 3 is a sectional rear elevational view of the present invention showing the component parts.

Referring now to FIG. 3, system 4 is mounted on the vehicle floor 2 as shown in FIG. 1. Vent hole 48 allows outside air to be drawn across condenser coil 31 to cool the refrigerant when the unit is operating on 115 volts. Vent hole 38 allows exhaust air to be discharged to the outside 39 by means of fan 33a during modes 4 and 5.

Figure 4:
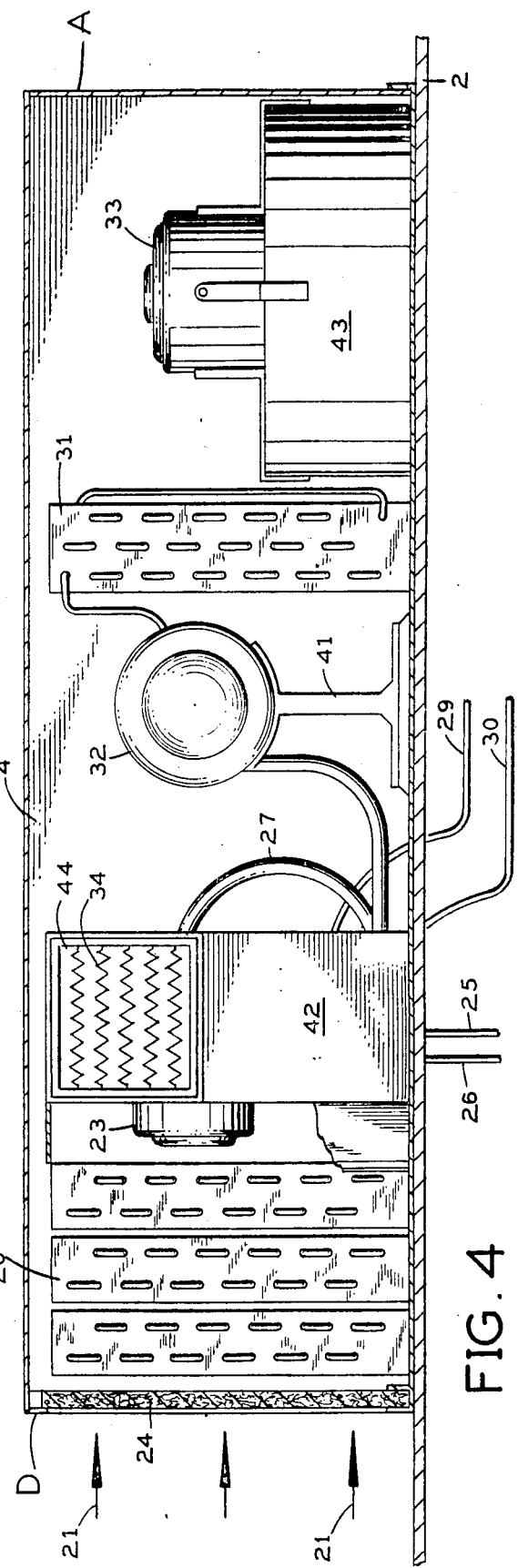
FIG. 4 is a sectional front elevational view of the present invention showing the component parts.

In FIG. 4 the viewer is looking into a cutaway of the front of system 4 as it is mounted on the vehicle floor 2. Brace 41 can be seen supporting hermetic compressor 32. Fan housings 42 and 43 are also visible. Primary fan exit duct 44 always supplies the passenger compartment 6 with conditioned air. Exit duct 44 lines up with exit vent 44a and/or 44b on the outside of the system 4, see FIGS. 5 and 6.

Figure 5:
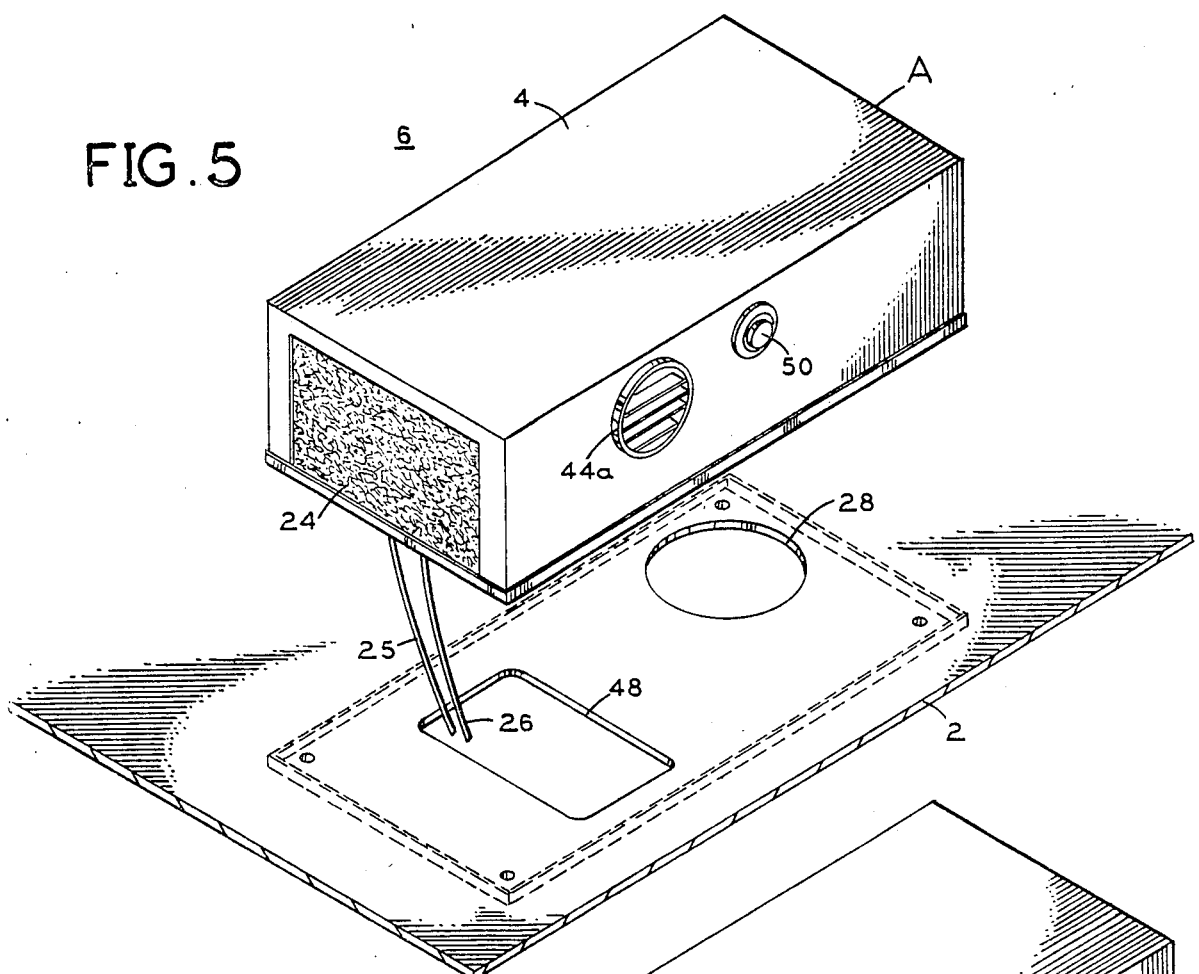
FIG. 5 is a top plan view showing the present invention about to be mounted inside a vehicle on the floor.

FIG. 5 shows vent hole 48 in vehicle floor 2. Vent hole 48 allows outside air to be drawn in by fan 33a for cooling the refrigerant in condenser coil 31 during operation. Vent hole 38 allows heated air to exit out the bottom of the vehicle during modes 4 and 5. Exit vents 44a deflect conditioned air into the passenger compartment 6. Thermostat 50 and controller (not shown) allow for standard adjustment of heating and cooling.

Figure 6:
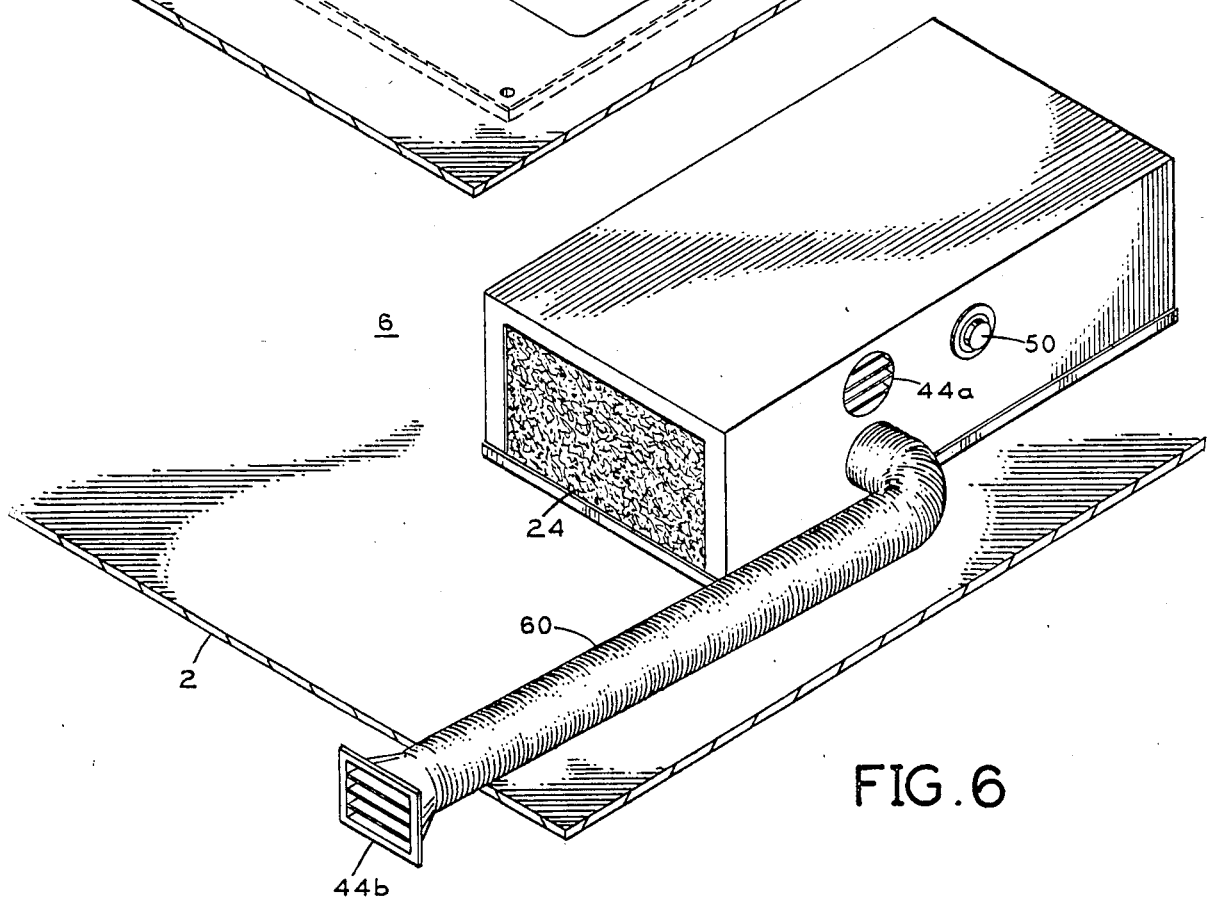
FIG. 6 is the same top plan view as FIG. 5 showing the present invention mounted on the floor and having an optional extension vent.

FIG. 6 shows an optional duct 60 which allows conditioned air to be vented anywhere in the passenger compartment 6.

FIG. 7 is a wiring diagram for the A.C./D.C. powered primary fan motor 23. A 115 volt A.C. source enters the system at 70. Transformer 71 has a neutral side 72. A.C. power is supplied to fan motor 33 by wire 73 as well as to hermetic compressor 32 and heating element 34. Cooling relay 74 controls power to the hermetic compressor 32 and the fan motor 33, and heating relay 75 controls power to the heating element 34. Transformer 71 has two secondary coils, 76 and 77. Secondary coil 77 is a 24 volt A.C. circuit controlling the relays 74, 75 and 79 by means of a thermostat control (not shown) which has a built in interlock for the 12 volt D.C. primary fan motor 23 for both heating and cooling. Secondary coil 76 supplies A.C. power to rectifier 78 which supplies D.C. power to blower relay contacts 79 and, if closed, on through capacitor 80 to operate primary fan motor 23. When blower relay 79 is energized for A.C. use (modes 4 or 5), the motor vehicle electrical system and 12 volt battery 82 is disconnected at the relay switch 79 to eliminate any backfeed from the A.C. power source 70. Switch 81 is a dash mounted switch to operate blower motor 23 for on-the-road use.

I claim:

1. A motor vehicle passenger compartment air conditioning system for a motor vehicle having an air conditioning refrigerant supply and an engine coolant system, comprising:

a container containing a three-in-one coil, an electric powered primary circulating fan, a refrigerant compressor having an output supply, a condenser coil and an electric powered exhaust fan, said three-in-one coil further comprising an on-the-road cooling circuit in fluid communication with said motor vehicle air conditioning refrigerant supply, a different on-the-road heating circuit in fluid communication with said motor vehicle engine coolant system, and a second different cooling circuit in fluid communication with said compressor's refrigerant output supply.

2. The air conditioning system of claim 1 wherein said container is mounted inside said motor vehicle on said vehicle floor on top of an air intake hole and a condenser coil exhaust hole.

3. The air conditioning system of claim 1 wherein an off-the-road cooling system comprises said compressor having A.C. power, said off-the-road cooling circuit of said three-in-one coil, said condenser coil, said exhaust fan having A.C. power and said primary fan having A.C. power.

4. The air conditioning system of claim 1 wherein an on-the-road cooling system comprises said on-the-road cooling circuit, and said primary fan having D.C. power from said motor vehicle's electrical system.

5. The air conditioning system of claim 3 wherein said off-the-road cooling system can be operated simultaneously on-the-road with said on-the-road cooling system comprising said on-the-road cooling circuit, and said primary circulating fan having A.C. power from said motor vehicle's on-board A.C. electric generator.

6. The air conditioning system of claim 1 wherein an on-the-road heating system comprises said on-the-road heating circuit, and said primary circulating fan having D.C. power.

7. The air conditioning system of claim 1 wherein an off-the-road heating system comprises said primary circulating fan having A.C. power and a heating coil mounted inside said primary circulating fan having A.C. power.

8. The air conditioning system of claim 1 wherein said primary circulating fan further comprises a flexible extendable exhaust duct.

9. The air conditioning system of claim 4 wherein said primary fan is an A.C. fan having a D.C. to A.C. inverter.

10. The air conditioning system of claim 6 wherein said primary fan is an A.C. fan having a D.C. to A.C. inverter.

* * * * *